(12) United States Patent
Reitz et al.

(10) Patent No.: US 6,977,057 B2
(45) Date of Patent: Dec. 20, 2005

(54) EMBOSSING PROCESS

(75) Inventors: John Bradford Reitz, Clifton Park, NY (US); Thomas Bert Gorczyca, Schenectady, NY (US); James Anthony Cella, Clifton Park, NY (US)

(73) Assignee: General Electric, Pittsfield, MA (US)

( * ) Notice: Subject to any disclaimer, the term of this patent is extended or adjusted under 35 U.S.C. 154(b) by 508 days.

(21) Appl. No.: 10/063,407

(22) Filed: Apr. 19, 2002

(65) Prior Publication Data

US 2003/0057601 A1 Mar. 27, 2003

Related U.S. Application Data

(60) Provisional application No. 60/285,323, filed on Apr. 19, 2001.

(51) Int. Cl.[7] .............................................. B29C 59/02
(52) U.S. Cl. ...................................................... 264/293
(58) Field of Search ......................................... 264/293

(56) References Cited

U.S. PATENT DOCUMENTS

| | | | |
|---|---|---|---|
| 3,803,085 A | 4/1974 | Takehoshi et al. | 260/46.5 |
| 3,905,942 A | 9/1975 | Takehoshi et al. | 260/47 |
| 3,972,902 A | 8/1976 | Heath et al. | 260/346.3 |
| 4,098,767 A | 7/1978 | Bilow | 526/262 |
| 4,100,138 A | 7/1978 | Bilow et al. | 526/262 |
| 4,363,844 A | 12/1982 | Lewis et al. | 428/65 |
| 4,431,761 A | 2/1984 | Hergenrother | 524/171 |
| 4,455,410 A | 6/1984 | Giles, Jr. | 525/436 |
| 4,567,240 A | 1/1986 | Hergenrother et al. | 525/328.1 |
| 4,609,712 A | 9/1986 | Evans et al. | 525/417 |
| 4,638,083 A | 1/1987 | Hergenrother et al. | 560/104 |
| 4,690,997 A | 9/1987 | Cella et al. | 528/26 |
| 4,808,686 A | 2/1989 | Cella et al. | 528/27 |
| 4,981,894 A | 1/1991 | Nye et al. | 524/401 |
| 5,028,681 A | 7/1991 | Peters | 528/27 |
| 5,104,958 A | 4/1992 | Bolon et al. | 528/26 |
| 5,194,566 A | 3/1993 | Takekoshi et al. | 528/170 |
| 5,218,030 A | 6/1993 | Katayose et al. | 524/371 |
| 5,407,972 A | 4/1995 | Smith et al. | 522/96 |
| 5,534,602 A | 7/1996 | Lupinski et al. | 525/432 |
| 5,552,009 A | 9/1996 | Zager et al. | 156/220 |
| 5,688,848 A | 11/1997 | Cella et al. | 524/141 |
| 5,772,905 A | 6/1998 | Chou | 216/44 |
| 5,869,595 A | 2/1999 | Fuller et al. | 528/322 |
| 5,969,079 A | 10/1999 | Lubowitz et al. | 528/170 |
| 6,025,113 A | 2/2000 | Kikawa et al. | 430/283.1 |
| 6,045,975 A | 4/2000 | Tani et al. | 430/285.1 |
| 6,252,001 B1 | 6/2001 | Babb et al. | 525/202 |
| 6,309,580 B1 | 10/2001 | Chou | 264/338 |
| 6,340,506 B1 | 1/2002 | Buchecker et al. | 428/1.26 |

FOREIGN PATENT DOCUMENTS

| | | |
|---|---|---|
| JP | 11045843 A * | 2/1999 |
| WO | WO/48172 A2 | 8/2000 |

OTHER PUBLICATIONS

Internatnional Search Report, mailed Aug. 21, 2002.

* cited by examiner

Primary Examiner—Leo B. Tentoni

(57) ABSTRACT

A method for manufacturing an embossed surface including a polymer composition having reactive moieties and a first glass transition temperature of $T_{g1}$. The method includes embossing the surface at temperature $T_{emb}$; and raising the first glass transition temperature $T_{g1}$ of the embossed polymeric surface to a second glass transition temperature $T_{g2}$ such that $T_{g2} > T_{emb}$. In another embodiment, a method for improving the release of a polymeric surface from an embossing tool includes incorporating of one or more of fluorine atoms, silicon atoms, or siloxane segments into the backbone of the polymer. The methods are particularly suited for direct patterning of photoresists, fabrication of interdigitated electrodes, and fabrication of data storage media.

28 Claims, 3 Drawing Sheets

EMBOSSING PROCESS

CROSS REFERENCE TO RELATED APPLICATIONS

This application claims priority to U.S. Ser. No. 60/285,323, filed Apr. 19, 2001, the entire contents of which are incorporated herein by reference.

BACKGROUND OF INVENTION

This disclosure relates to the embossing of polymeric surfaces, and the articles formed thereby.

Optical, magnetic, and magneto-optic media are primary sources of high performance storage technology, allowing both high storage capacity and reasonable cost per megabyte of storage. One such type of media generally comprises a substrate covered by a polymer film. The film can be embossed to provide, for example, pits, grooves, asperities, bit patterns, servo-patterns, and edge features. The desired surface quality can also be embossed e.g., to obtain a desired smoothness, roughness, flatness, microwaviness, and texture, e.g., microtexturing for magnetic grain orientation. The embossed surface features can have a depth of up to about 200 nanometers (nm). Deeper features or features that vary outside the ranges can be produced, but, in general, for flying head applications, these can result in undesirable head-disk interactions. In the lateral dimension, the surface features, particularly of a magnetic data storage media, preferably have a "short" dimension of up to or exceeding about 250 nm, with less than about 200 nm more preferred, less than about 150 nm even more preferred, and less than about 100 nm especially preferred.

It is presently difficult to emboss polymer surfaces having high glass transition temperatures with nanometer-scale precision because extremely elevated temperatures (well above the glass transition) are required to ensure adequate flow and pattern replication. Under these conditions, there is potential to not only degrade the polymer surface, but also damage the substrate or surrounding sensitive layers and features.

When using either high or low glass transition polymers, another drawback associated with embossing methods such as hot stamping is the significant degree of adhesion that can develop between the embossed polymer surface and the stamping tool. This is particularly a problem when embossing at high temperatures. Such adhesion can lead to a number of problems, for example nanoscale defects and roughness, and gross defects such as film or stamper damage upon separation. Traditionally, adhesion of this type is mitigated through the use of mold release agents and other low surface energy molecules. These may be used as additives in the polymer, and/or applied topically to the mold surface and/or the surface of the polymer. While effective, these approaches are not often compatible with high temperature embossing processes, wherein the materials can undergo reaction and/or degradation at elevated temperature. The use of topically applied materials additionally necessitates reapplication after a relatively low number of molding cycles, adding to process cost and complexity. Finally, in the case of sub-micron replicated features, build-up of mold release additives can lead to poor feature replication.

There accordingly remains a need in the art for methods and materials that enable the embossing of polymeric surfaces without degradation, and/or with nanometer-scale precision, whether at high or low temperatures.

SUMMARY OF INVENTION

A method for embossing a surface of a polymer with a first glass transition temperature (Tg1), the method comprising: embossing the surface at temperature Temb; and altering the Tg1 of the surface to provide a second glass transition temperature (Tg2), wherein altering is during embossing, after embossing, or both during and after embossing.

In another embodiment, a method for improving the release of a polymeric surface from an embossing tool comprises incorporating of one or more of fluorine atoms, silicon atoms, or siloxane segments into the backbone of polymer.

BRIEF DESCRIPTION OF DRAWINGS

Referring now to the drawings, which are meant to be exemplary, not limiting.

DETAILED DESCRIPTION

Figure 1:
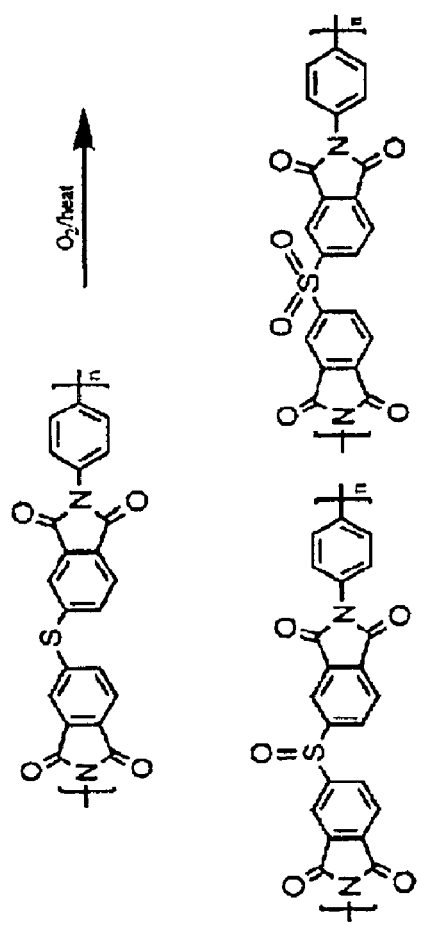
FIG. 1 shows an exemplary embodiment of a polymer comprising reactive sulfide moieties, wherein the glass transition temperature Tg2 may be increased to a temperature greater than the embossing temperature Temb.

Glass transition temperature (hereinafter "Tg") is described in PRINCIPLES OF POLYMER CHEMISTRY, Flory, Cornell University Press, Ithaca, N.Y., 1953, pages 52–57. The Tg of a material can be calculated as described by Fox in Bull. Amer. Physic. Society, Vol. 1, No. 3, page 123 (1956), and can be measured experimentally by using a penetrometer such as a DuPont 940 Thermomedian Analyzer. A number of factors can affect the Tg of a material, including, for example, the identity of the polymer, the level of crosslinking, processing conditions, and the presence of additives such as plasticizers, fillers, and the like.

For purposes of this disclosure, the temperature at which a material is embossed (the embossing temperature) is denoted as Temb, while the glass transition temperature of that material prior to embossing is denoted as Tg1. Temb may vary from slightly lower to slightly higher than the glass transition temperature Tg1. In accordance with the present method, a material having a first Tg (Tg1) is embossed, and the material is treated so as to provide it with a second glass transition temperature, denoted herein as Tg2. Treatment includes, but is not limited to, processes such as crosslinking, chain extension, solvent removal, plasticizer removal, reactive plasticization, and the like. Such treatment may be concurrent with or subsequent to the embossing. It is generally desirable for Tg2 to be greater than Temb and Tg1. While the present methods find utility with polymers having a low Tg (typically greater than about 90° C.), they are also useful for polymers having a Tg of greater than about 120° C., preferably greater than about 150° C., and more preferably greater than about 180° C. The methods may also be used to emboss high Tg polymers, which are defined herein as polymers having a Tg greater than or equal to about 200 ° C.

In one embodiment, the Tg of the polymer is depressed (Tg1), the polymer is embossed, and the Tg of the polymer is then returned to its typical Tg (Tg2). For example, amorphous polyimide polymers typically have a Tg of greater than about 200° C. The Tg of polyimides can be temporarily depressed to Tg1 as the result of a reversible chemical change in the structure, environment, and the like, of the polymer molecules. During or following embossing, the factors that caused the depression of the glass transition to Tg1 are reversed or removed, thereby allowing the embossed polymer to return to a higher glass transition temperature Tg2, which is preferably greater than both Tg1 and Temb.

In another embodiment, the Tg of the polymer is not first adjusted, i.e., the Tg of the material as embossed is Tg1. Embossing is at or close to Tg1, and during or following embossing, the Tg of the embossed polymer is adjusted, preferably raised, to Tg2. For semi-crystalline polymers such as polyesters, polyamides, and the like, the embossing may be carried out at a temperature from slightly below the Tg1 to slightly above the Tg1, for example by crosslinking, curing, or deplasticization.

Suitable polymers for embossing include thermoplastics, thermosets, blends of thermoplastics, thermoplastic copolymers, blends of thermosets, blends of thermoplastics with thermosets and the like. Suitable thermoplastics and thermoplastic blends include, but are not limited to, polyvinyl chloride, polyolefins (including but not limited to linear and cyclic polyolefins and including polyethylene, chlorinated polyethylene, polypropylene, and the like), polyesters (including, but not limited to, polyethylene terephthalate, polybutylene terephthalate, polycyclohexylmethylene terephthalate, and the like), polyamides, polysulfones (including but not limited to hydrogenated polysulfones, and the like), polyimides, polyether imides, polyether sulfones, polyphenylene sulfides, polyether ketones, polyether ether ketones, acrylonitrile-butadiene-styrene (ABS) resins, polystyrenes (including, but not limited to, hydrogenated polystyrenes, syndiotactic and atactic polystyrenes, polycyclohexyl ethylene, styrene-co-acrylonitrile, styrene-co-maleic anhydride, and the like), polybutadiene, polyacrylates (including, but not limited to, polymethylmethacrylate, methyl methacrylate-polyimide copolymers, and the like), polyacrylonitrile, polyacetals, polycarbonates, polyphenylene ethers (including, but not limited to, those derived from 2,6-dimethylphenol and copolymers with 2,3,6-trimethylphenol, and the like), ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, polytetrafluorethylenes, and the like, and combinations comprising at least one of the foregoing thermoplastic polymers.

Additional specific non-limiting examples of blends of thermoplastic polymers include acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, nylon/elastomers, polyester/elastomers, polyethylene terephthalate/polybutylene terephthalate, acetal/elastomer, styrene-maleic anhydride/acrylonitrile-butadiene-styrene, polyimide/polysiloxane, polyetherimide/polysiloxane, polyether etherketone/polyethersulfone, polyethylene/nylon, polyethylene/polyacetal, and the like, and combinations comprising at least one of the foregoing blends of thermoplastic polymers.

Suitable thermosetting polymers include but are not limited to thermosetting resins such as epoxy, phenolics, alkyds, polyesters, polyurethanes, silicone polymers, mineral filled silicones, bis-maleimides, cyanate esters, vinyl, benzocyclobutene polymers, and the like, as well as combinations comprising at least one of the foregoing thermosetting polymers.

Additionally, the polymers may comprise blends, copolymers, mixtures, reaction products, and combinations comprising at least one of the foregoing thermoplastics and thermosets. Particularly preferred polymers are polyesters, partly fluorinated polymers such as perfluorocarbons, polyarylene ethers, polyethersulfones, polysulfones, polyetherimides, polyimides, polyamidimides, and polyacetals. Of these, the most preferred for embossing are polyimides and polyetherimides, copolymers of polyimides and polyetherimides, and blends of polyimides and polyetherimides with perfluorocarbons.

Suitable polyimides have the general formula (I)

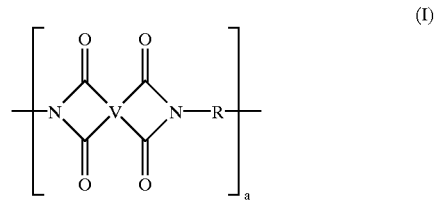

wherein a is more than 1, typically about 10 to about 1000 or more, and more preferably about 10 to about 500; and wherein V is a tetravalent linker without limitation, as long as the linker does not impede synthesis or use of the polyimide. Suitable linkers include but are not limited to: (a) substituted or unsubstituted, saturated, unsaturated or aromatic monocyclic and polycyclic groups having about 5 to about 50 carbon atoms, (b) substituted or unsubstituted, linear or branched, saturated or unsaturated alkyl groups having about 1 to about 30 carbon atoms; or combinations thereof. Suitable substitutions and/or linkers include, but are not limited to, ethers, epoxides, amides, esters, and combinations thereof. Preferred linkers include but are not limited to tetravalent aromatic radicals of formula (II), such

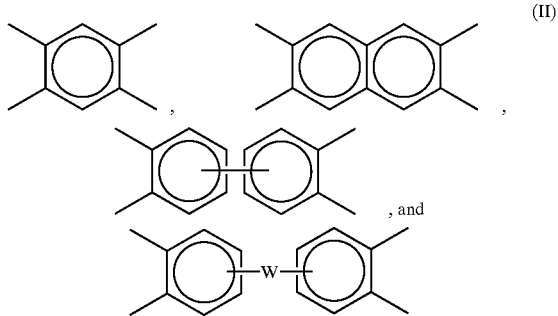

wherein W is a divalent moiety selected from the group consisting of —O—, —S—, —C(O)—, —SO2—, —SO—, —C(CF3)2—, —CyH2y— (y being an integer from 1 to 5), and halogenated derivatives thereof, including perfluoroalkylene groups, or a group of the formula —O—Z—O— wherein the divalent bonds of the —O— or the —O—Z—O— group are in the 3,3', 3,4', 4,3', or the 4,4' positions, and wherein Z includes, but is not limited, to divalent radicals of formula (III).

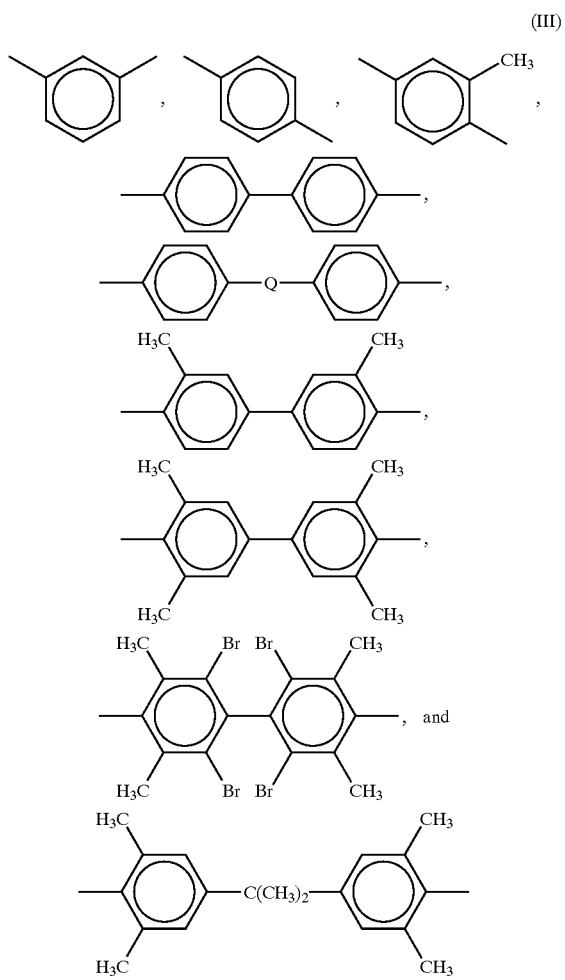

(III)

R in formula (I) includes but is not limited to substituted or unsubstituted divalent organic radicals such as: (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (IV)

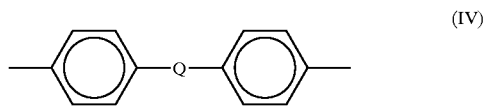

(IV)

wherein Q includes but is not limited to a divalent moiety selected from the group consisting of —O—, —S—, —C(O)—, —SO2—, CyH2y— (y being an integer from 1 to 5), and halogenated derivatives thereof, including perfluoroalkylene groups.

Preferred classes of polyimides include polyetherimides, particularly those polyetherimides known in the art which are melt processable, such as those whose preparation and properties are described in U.S. Pat. Nos. 3,803,085 and 3,905,942.

Preferred polyetherimide resins comprise more than 1, typically about 10 to about 1000 or more, and more preferably about 10 to about 500 structural units, of the formula (V)

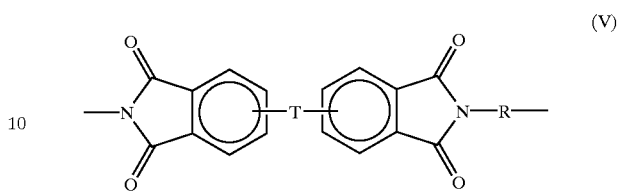

(V)

wherein T is —O— or a group of the formula —O—Z—O— wherein the divalent bonds of the —O— or the —O—Z—O— group are in the 3,3', 3,4', 4,3', or the 4,4' positions, and wherein Z includes, but is not limited, to divalent radicals of formula (III) as defined above.

In one embodiment, the polyetherimide may be a copolymer that, in addition to the etherimide units described above, further contains polyimide structural units of the formula (VI)

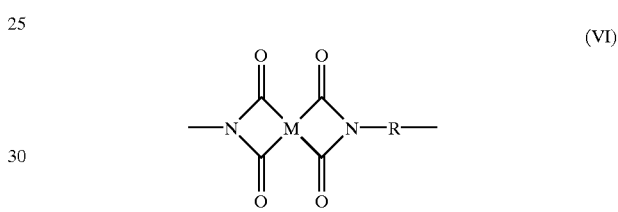

(VI)

wherein R is as previously defined for formula (I) and M includes, but is not limited to, radicals of formula (VII).

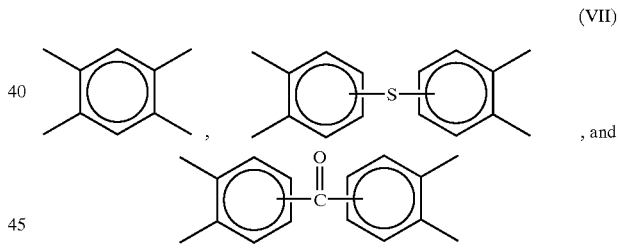

(VII)

Polyetherimides can be prepared by methods well known to those skilled in the art, including the reaction of an aromatic bis(ether anhydride) of the formula (VIII)

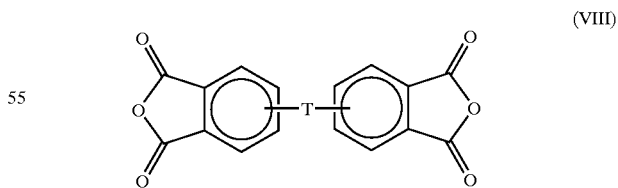

(VIII)

with an organic diamine of the formula H2N—R—NH2 (IX) wherein T is defined in formula (V) and R is defined in the formula (I).

Examples of specific aromatic bis(ether anhydride)s and organic diamines are disclosed, for example, in U.S. Pat. Nos. 3,972,902 and 4,455,410. Illustrative examples of aromatic bis(ether anhydride)s of formula (VIII) include:

2,2-bis[4-(3,4-dicarboxyphenoxy)phenyl]propane dianhydride; 4,4'-bis(3,4-dicarboxyphenoxy) diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy) diphenyl sulfone dianhydride; 4-(2,3-dicarboxyphenoxy)-4'-(3,4-dicarboxyphenoxy) diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures thereof.

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent. A preferred class of aromatic bis(ether anhydride)s included by formula (VIII) above includes, but is not limited to, compounds wherein T is of the formula (X)

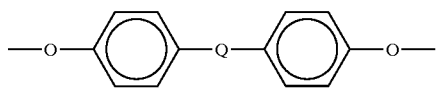

(X)

and the ether linkages, for example, are preferably in the 3,3', 3,4', 4,3', or 4,4' positions, and mixtures thereof, and where Q is as defined above.

Many different diamino compounds may be employed in the production of polyimides and polyetherimides. Examples of suitable compounds are ethylenediamine, propylenediamine, trimethylenediamine, toluenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methyinonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3' dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(b-amino-t-butyl) toluene, bis(p-b-amino-t-butylphenyl) ether, bis(p-b-methyl-o-aminophenyl) benzene, bis(p-b-methyl-o-aminopentyl) benzene, 1,3-diamino-4-isopropylbenzene, bis(4-aminophenyl) sulfide, bis (4-aminophenyl) sulfone, bis(4-aminophenyl) ether and 1,3-bis(3-aminopropyl) tetramethyidisiloxane. Mixtures of these compounds may also be present. The preferred diamino compounds are aromatic diamines, especially m- and p-phenylenediamine and mixtures thereof.

Additional useful structures for preparing polyetherimides are the dianhydrides shown in formulas VIIIa, VIIIb, and VIIIc below, where n is about 1 to about 50,

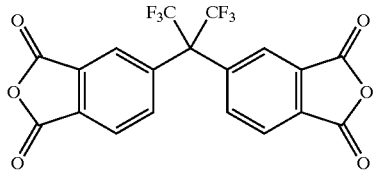

(VIIIa)

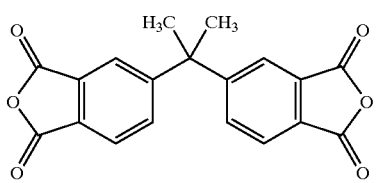

(VIIIb)

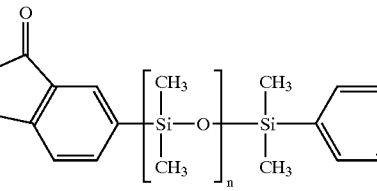

(VIIIc)

as well as the diamines shown in formulas IXa and IXb below, where n is about 1 to about 50.

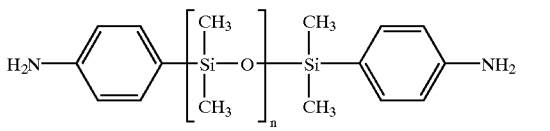

(IXa)

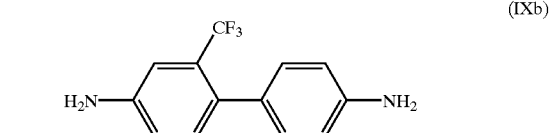

(IXb)

In another preferred embodiment, the polyetherimide resin comprises structural units according to formula (V) wherein each R is independently p-phenylene, m-phenylene, or a mixture thereof and T is a divalent radical of the formula (XI)

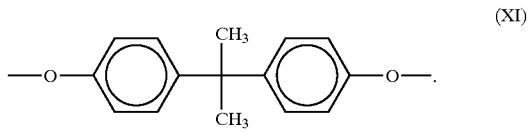

(XI)

Included among the many methods of making the polyimides, particularly polyetherimides, are those disclosed in U. S. Pat. Nos. 3,847,867, 3,814,869, 3,850,885, 3,852,242, 3,855,178, 3,983,093, and 4,443,591.

In general, the reactions can be carried out employing well-known solvents, e.g., o-dichlorobenzene, m-cresol/toluene and the like, to effect a reaction between the anhydride of formula (VIII) and the diamine of formula (IX), at temperatures of about 100° C. to about 250° C. Alternatively, the polyetherimide can be prepared by melt polymerization of aromatic bis(ether anhydride)s (VIII) and diamines (IX) by heating a mixture of the starting materials to elevated temperatures with concurrent stirring. Generally, melt polymerizations employ temperatures of about 200° C. to about 400° C. Chain stoppers and branching agents may also be employed in the reaction. When polyetherimide/ polyimide copolymers are employed, a dianhydride, such as pyromellitic anhydride, is used in combination with the bis(ether anhydride). The polyetherimide resins can optionally be prepared from reaction of an aromatic bis (ether anhydride) with an organic diamine in which the diamine is present in the reaction mixture at no more than about 0.2 molar excess, and preferably less than about 0.2 molar excess. Under such conditions the polyetherimide resin has less than about 15 microequivalents per gram (° eq/g) acid titratable groups, and preferably less than about 10° eq/g acid titratable groups, as shown by titration with chloroform solution with a solution of 33 weight percent (wt %) hydrobromic acid in glacial acetic acid. Acid-titratable groups are essentially due to amine end-groups in the polyetherimide resin.

Generally, useful polyetherimides have a melt index of about 0.1 to about 10 grams per minute ("g/min"), as measured by American Society for Testing Materials ("ASTM") D1238 at 295° C., using a 6.6 kilogram ("kg") weight. In a preferred embodiment, the polyetherimide resin has a weight average molecular weight (Mw) of about 10,000 to about 150,000 grams per mole ("g/mole"), as measured by gel permeation chromatography, using a polystyrene standard. Such polyetherimide resins typically have an intrinsic viscosity [°] greater than about 0.2 deciliters per gram, preferably about 0.35 to about 0.7 deciliters per gram measured in m-cresol at 25° C.

The polyimides of formula (I) and the polyetherimides of formula (V) may be copolymerized with other monomers or polymers such as polysiloxanes, polyesters, polycarbonates, polyacrylates, fluoropolymers, and the like. Preferred among these are polysiloxanes having the formula

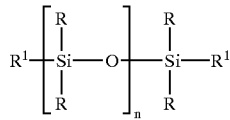

(XII)

wherein R is the same or different $C_{(1-14)}$ monovalent hydrocarbon radical or $C_{(1-14)}$ monovalent hydrocarbon radical substituted with radicals inert during polycondensation or displacement reactions, and n is an integer from about 1 to about 200. The reactive end group $R^1$ is a functionality capable of reacting with the reactive endgroups on the polyimide of formula (I) or the polyetherimide of formula (V). Reactive end groups include, for example, halogen atoms; lower dialkylamino groups of from 2 to about 20 carbon atoms; lower acyl groups of from 2 to about 20 carbon atoms; lower alkoxy of from 2 to about 20 carbon atoms; and hydrogen.

Particularly preferred siloxane oligomers are those in which $R^1$ represents a dimethylamino group, a hydroxyl group, an acetyl group, or a chlorine atom. U.S. Pat. No. 3,539,657 to Noshay et al. discloses certain siloxane-polyarylene polyether block copolymers, and describes, in general and specific terms, numerous siloxane oligomers having reactive end groups.

The polyimide-siloxane copolymers used for embossing may be block or graft copolymers wherein the polysiloxane oligomer is present in an amount of greater than or equal to about 1, preferably greater than or equal to about 3, more preferably greater than or equal to about 5 wt % of the polyimide-siloxane copolymer. It is generally desirable for the polysiloxane oligomer to be present in an amount of less than or equal to about 60, preferably less than or equal to about 45, and more preferably less than or equal to about 40 wt % of the polyimide-siloxane copolymer. The reaction between the polyimide oligomer and the siloxane oligomer is conducted under etherification conditions. Such conditions generally include a substantially anhydrous, organic reaction medium, and an elevated temperature. The temperature advantageously ranges from about 100° C. to about 225° C., preferably from about 150° C. to about 200° C. The reaction is conducted in an inert organic solvent, and preferred solvents are the non-polar aprotic and polar aprotic reaction solvents. A particularly preferred reaction solvent is o-dichlorobenzene. Other suitable methods are set forth in U. S. Pat. Nos. 4,690,997, 4,808,686, 4,981,894, 5,028,681, 5,104,958, and 5,194,566.

The embossed polymer surfaces may also include blends of polyetherimide siloxane copolymer or polyimide siloxane copolymer with a polyetherimide or a polyimide. The amount of polyetherimide siloxane copolymer or polyimide siloxane copolymer is preferably effective to enhance the impact strength of the polymer composition, and can vary over a fairly wide range. For example, the copolymer can be present in an amount of greater than or equal to about 2, preferably greater than or equal to about 5 wt % of the total polymer composition. Similarly, the copolymer may be present in an amount of less than or equal to about 90, preferably less than or equal to about 75, preferably less than or equal to about 35 wt % of the total polymer composition.

Perfluorocarbon polymers may also be used in blends with the polymers that are to be embossed. Suitable perfluorocarbon polymers are thermoplastic fluorinated polyolefins that maybe semi-crystalline in structure and have a melting point in excess of about 100° C. They are preferably a polymer of one or more of perfluorinated monomers containing ethylenic unsaturation and optionally one or more other compounds containing ethylenic unsaturation. Suitable monomers include, for example, perfluorinated monoolefins, such as hexafluoropropylene or tetrafluoroethylene, and perfluoroalkyl vinyl ethers in which the alkyl group contains up to six carbon atoms, e.g., perfluoro (methyl vinyl ether). The monoolefin is preferably a straight or branched chain compound having a terminal ethylenic double bond and containing less than six carbon atoms, especially two or three carbon atoms. The perfluorocarbon polymers also include those in which portions of the fluorine atoms have been replaced by other halogen atoms, such as chlorine or bromine. Preferred perfluorocarbon polymers include polytetrafluoroethylene, polychlorotrifluoroethylene, polybromotriflurooethylene, and copolymers thereof. A particularly preferred fluorinated polyethylene is polytetrafluoroethylene. Other suitable fluorinated polyolefins include polyperfluoropropane, polyperfluorobutadiene, polyhexafluoropropylene, fluorinated ethylene propylene copolymer, and perfluoroalkoxy resin.

In one embodiment, the molecular weight of preferred perfluorocarbon polymers is generally less than about 500, 000. Particularly preferred polytetrafluorethylenes having number average weights of less than about 100,000. The optimal molecular weight may vary from one perfluorocarbon polymer to another, and can be determined empirically. The perfluorocarbon polymers are advantageously dispersed in the thermoplastic matrix. Uniform dispersion of the perfluorocarbon polymer throughout the matrix results in products having low adhesion to the mold. Dispersibility is related to the molecular weight and/or particle size of the perfluorocarbon polymer. The uniformity of the dispersion of the perfluorocarbon polymer can be determined by observing the physical appearance of the molded product or test specimen and by measuring the degree of elongation at break of the product. Low elongation values are indicative of poorly dispersed products.

The perfluorocarbon polymers are employed in particulate form, preferably in the form of finely divided solids. The perfluorocarbon polymers may be polymerized to a high molecular weight and then broken down to a desired lower molecular weight and particle size by irradiation. Preferred perfluorocarbon polymers are polymerized in Freon to a desired molecular weight using a chain stopper. Examples of perfluorocarbon polymers prepared by the latter procedure are VYDAX® AR and VYDAX® 1000, which are available from E. I. du Pont de Nemours Co., Inc., Wilmington, Del., U.S.A. An example of a perfluorocarbon polymer prepared by the irradiation procedure is POLYMIST® FSA available from Ausimont, Morristown, N.J. U.S.A.

The increase in the glass transition temperature to Tg2 either during or after the embossing process may be made, for example, by physical or chemical crosslinking. Chemical crosslinking may be achieved by inclusion of reactive moieties in the embossed polymer that will confer a higher glass transition temperature to the polymer upon reacting. The reactive moieties may be physically blended with the polymer or covalently bound to the polymer, by reaction with the polymer or copolymerization. Suitable reactive moieties include but are not limited to, vinyl substituted aromatic monoamines, polyfunctional alkenyl aromatic monomers, acryloyl monomers, sulfides, pr toluidines, ethynyl, ethnyl or ethenyl groups, strained ring systems (such as epoxides), fluoroolefins, alkoxysilanes, and the like. These types of reactive moieties may function by facilitating crosslinking or chain extension of the embossed polymer surface, thereby increasing molecular weight and consequently increasing the glass transition temperature to Tg2.

Suitable vinyl substituted aromatic monoamine compounds include, for example, vinyl aniline, aminophenyl ethylene (APE), alkyl substituted vinyl substituted anilines such as vinyl substituted toluidines and xylidines, vinyl substituted naphthylamines, vinyl substituted monoamino substituted biphenyls, and the like. Aminophenyl ethylene (APE) is preferred.

When the embossed polymer comprises a polyarylene ether, a preferred reactive moiety is a polyfunctional alkenyl aromatic monomer. Polyfunctional alkenyl aromatic monomer may generally be used as reactive moieties when polyarylene ethers are used in the embossed surface. Suitable polyfunctional alkenyl aromatic monomer may have the structure (XIII):

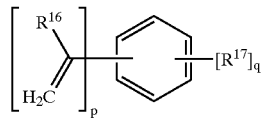

(XIII)

wherein each $R^{16}$ is independently hydrogen, $C_1$–$C_{12}$ alkyl, $C_2$–$C_{12}$ alkenyl, $C_2$–$C_{12}$ alkynyl, $C_6$–$C_{18}$ aryl, or the like; each $R^{17}$ is independently halogen, $C_1$–$C_{12}$ alkyl, $C_1$–$C_{12}$ alkoxyl, $C_6$–$C_{18}$ aryl, or the like; p is 2 to 4; and q is 0 to 4. Suitable polyfunctional alkenyl aromatic monomers include those such as 1,2-divinylbenzene, 1,3-divinylbenzene, 1,4-divinylbenzene, trivinylbenzenes, 1,3-diisopropenyl-benzene, 1,4-diisopropenylbenzene, and the like; and mixtures comprising at least one of the foregoing alkenyl aromatic monomers. In the foregoing for which no substituent position is specified, the substituents may occupy any free position on the aromatic ring.

In one embodiment, a suitable polyfunctional acryloyl reactive moiety comprises at least two acryloyl groups having the structure (XIV):

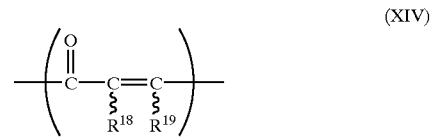

(XIV)

wherein $R^{18}$ and $R^{19}$ are each independently hydrogen, $C_1$–$C_{12}$ alkyl, or the like; and wherein $R^{18}$ and $R^{19}$ may be disposed either cis or trans about the carbon-carbon double bond. Preferably, $R^{18}$ and $R^{19}$ are each independently hydrogen or methyl.

Suitable polyfunctional acryloyl reactive moieties of this type include, for example, unsaturated polyester resins that are the polycondensation reaction product of one or more dihydric alcohols and one or more ethylenically unsaturated polycarboxylic acids. By polycarboxylic acid is meant polycarboxylic or dicarboxylic acids or anhydrides, polycarboxylic or dicarboxylic acid halides, and polycarboxylic or dicarboxylic esters. For example, suitable unsaturated polycarboxylic acids, and the corresponding anhydrides and the acid halides that contain polymerizable carbon-to-carbon double bonds, may include maleic anhydride, maleic acid, and fumaric acid. A minor proportion of the unsaturated acid, up to about forty mole percent, may be replaced by dicarboxylic or polycarboxylic acid that does not contain a polymerizable carbon-to-carbon bond. Examples thereof include the acids (and corresponding anhydrides and acid halides): orthophthalic, isophthalic, terephthalic, succinic, adipic, sebacic, methylsuccinic, and the like. Dihydric alcohols that are useful in preparing the polyesters include, for example, 1,2-propanediol (hereinafter referred to as propylene glycol), dipropylene glycol, diethylene glycol, 1,3-butanediol, ethylene glycol, glycerol, and the like. Examples of suitable unsaturated polyesters are the polycondensation products of (1) propylene glycol and maleic and/or fumaric acids; (2) 1,3-butanediol and maleic and/or fumaric acids; (3) combinations of ethylene and propylene glycols (approximately 50 mole percent or less of ethylene glycol) and maleic and/or fumaric acids; (4) propylene glycol, maleic and/or fumaric acids and dicyclopentadiene reacted with water; and the like; and mixtures comprising at least one of the foregoing polyfunctional acryloyl monomers. In addition to the above-described polyesters, dicyclopentadiene modified unsaturated polyester resins such as those described in U.S. Pat. No. 3,883,612 to Pratt et al. may be used. The molecular weight of the polymerizable unsaturated polyester may vary over a considerable range, but ordinarily useful polyesters have a number average molecular weight of about 300 AMU to about 5,000 AMU, and more preferably about 500 AMU to about 5,000 AMU.

In another embodiment, the polyfunctional acryloyl reactive moiety is a monomer comprising at least two acryloyl moieties having the structure (XV):

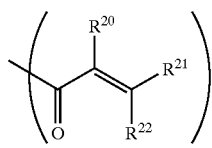

wherein $R^{20}$–$R^{22}$ are each independently hydrogen, $C_1$–$C_{12}$ alkyl, $C_2$–$C_{12}$ alkenyl, $C_6$–$C_{18}$ aryl, $C_7$–$C_{18}$ alkyl-substituted aryl, $C_7$–$C_{18}$ aryl-substituted alkyl, $C_2$–$C_{12}$ alkoxycarbonyl, $C_7$–$C_{18}$ aryloxycarbonyl, $C_8$–$C_{18}$ alkyl-substituted aryloxycarbonyl, $C_8$–$C_{18}$ aryl-substituted alkoxycarbonyl, nitrile, formyl, carboxylate, imidate, thiocarboxylate, or the like. Preferably, $R^{20}$–$R^{22}$ are each independently hydrogen or methyl.

Suitable polyfunctional acryloyl monomers further include, for example, compounds produced by condensation of an acrylic or methacrylic acid with a diepoxide, such as bisphenol-A diglycidyl ether, butanediol diglycidyl ether, or neopenylene glycol dimethacrylate. Specific examples include 1,4-butanediol diglycidylether di(meth)acrylate, bisphenol A diglycidylether dimethacrylate, and neopentylglycol diglycidylether di(meth)acrylate, and the like. Also included as polyfunctional acryloyl monomers are the condensation of reactive acrylate or methacrylate compounds with alcohols or amines to produce the resulting polyfunctional acrylates or polyfunctional acrylamides. Examples include N,N-bis(2-hydroxyethyl)(meth)acrylamide, methylenebis((meth)acrylamide), 1,6-hexamethylenebis((meth)acrylamide), diethylenetriamine tris((meth)acrylamide), bis (gamma-((meth)acrylamide)propoxy) ethane, beta-((meth)acrylamide) ethylacrylate, ethylene glycol di((meth)acrylate)), diethylene glycol di(meth)acrylate, tetraethylene glycol di(meth)acrylateglycerol di(meth)acrylate, glycerol tri(meth)acrylate, 1,3-propylene glycol di(meth)acrylate, dipropyleneglycol di(meth)acrylate, 1,4-butanediol di(meth)acrylate, 1,2,4-butanetriol tri(meth)acrylate, 1,6-hexanedioldi(meth)acrylate, 1,4-cyclohexanediol di(meth)acrylate, 1,4-benzenediol di(meth)acrylate, pentaerythritoltetra(meth)acrylate, 1,5-pentanediol di(meth)acrylate, trimethylolpropane di(meth)acrylate, trimethylolpropane tri(meth)acrylate), 1,3,5-triacryloylhexahydro-1,3,5-triazine, 2,2-bis(4-(2-(meth)acryloxyethoxy)phenyl) propane, 2,2-bis(4-(2-(meth)acryloxyethoxy)-3,5-dibromophenyl)propane, 2,2-bis ((4-(meth)acryloxy)phenyl)propane, 2,2-bis((4-(meth)acryloxy)-3,5-dibromophenyl) propane, and the like, and mixtures comprising at least one of the foregoing polyfunctional acryloyl monomers. It will be understood that the suffix (meth)acryl- denotes either acryl- or methacryl-.

Preferred polyfunctional acryloyl monomers include trimethylolpropane tri(meth) acrylate, 1,6-hexanediol di(meth)acrylate, ethylene glycol di(meth)acrylate, propylene glycol di(meth)acrylate, cyclohexanedimethanol di(meth)acrylate, butanedioldi(meth) acrylate, diethylene glycol di(meth)acrylate, triethylene glycol di(meth)acrylate, and the like, and mixtures comprising at least one of the foregoing polyfunctional acryloyl monomers.

Sulfides may also be utilized as reactive moieties for increasing the Tg of the polymer surface to be embossed. Chief among the sulfides are polyarylene sulfides having halogen termination, for example those having the formula XR–(SR)n+2–X wherein R is a C(6–14) arylene radical, or C(6–14) arylene radical substituted with radicals inert during displacement, X is a halogen radical such as chloro and n is 0 to 50.

Amino terminated polyarylene sulfides having the formula H2RN–(SR)n+2–NH2 may also be used, wherein R and n are as defined above. Amino terminated polyarylene sulfides can be made by effecting a reaction between halogen-terminated polyarylene sulfide and an amino thioarylol, in the presence of an acid acceptor, such as an alkali metal carbonate to produce the corresponding terminated polyarylene sulfide shown above. Details of making the polyarylene sulfides and incorporating them into various polyimides, polyetherimides and polyetherimide-siloxane copolymers are available in U.S. Pat. Nos. 4,609,712 and 5,194,566.

Ethynyl end capping may also be used to increase the Tg of the polymer. Ethynyl endcapping is typically carried out using 4-ethynylbenzoyl chloride and can generally be used for end-capping polymers having terminal groups that react with acid chlorides, such as hydroxyl, amine, amide and similar groups. U.S. Pat. Nos. 4,431,761, 4,567,240 and 4,638,083 detail the reactions of 4-ethynylbenzoyl chloride with various oligomer and polymers to produce ethynyl end caps. Ethynyl terminated polyimides are detailed in U.S. Pat. Nos. 4,098,767 and 4,100,138.

Epoxy functional materials suitable for use as reactive moieties may contain aliphatic, cycloaliphatic, or aromatic epoxy groups, and may be monomeric, dimeric, oligomeric, or polymeric materials having at least one epoxy group. Generally, epoxy functional reactive moieties suitable for use herein are derived by the reaction of an epoxidizing agent, such as peracetic acid, and an aliphatic or cycloaliphatic point of unsaturation in a molecule. Other functionalities that will not interfere with the epoxidizing action of the epoxidizing agent may also be present in the molecule, for example, esters, ethers, hydroxy, ketones, halogens, aromatic rings, and the like. A well-known class of epoxy functionalized reactive moieties are glycidyl ethers of aliphatic or cycloaliphatic alcohols or aromatic phenols. The alcohols or phenols may have more than one hydroxyl group. Suitable glycidyl ethers may be produced by the reaction of, for example, monophenols or diphenols such as bisphenol-A with epichlorohydrin. Polymeric aliphatic epoxides might include, for example, copolymers of glycidyl methacrylate or allyl glycidyl ether with methyl methacrylate, styrene, acrylic esters, or acrylonitrile. Other classes of curable epoxy containing polymers are epoxy-siloxane resins, epoxy-polyurethanes, and epoxy-polyesters. Such polymers usually have epoxy functional groups at the ends of their chains. Epoxy-siloxane resins and method for making are more particularly shown by E. P. Plueddemann and G. Fanger, J. Am. Chem. Soc. 80, 632–635 (1959). As described in the literature, epoxy resins can also be modified in a number of standard ways such as by reaction with amines, carboxylic acids, thiols, phenols, alcohols, and the like, as shown in U.S. Pat. Nos. 2,935,488; 3,235,620; 3,369,055; 3,379,653; 3,398,211; 3,403,199; 3,563,850; 3,567,797; and 3,677,995. Further examples of useful epoxy resins are shown in the Encyclopedia of Polymer Science and Technology, Vol 6, 1967, Interscience Publishers, New York, pp 209–271.

Specifically, the epoxies that can be employed herein include glycidol, bisphenol-A diglycidyl ether, tetrabromobisphenol-A diglycidyl ether, diglycidyl ester of phthalic acid, diglycidyl ester of hexahydrophthalic acid, epoxidized soybean oil, butadiene diepoxide, tetraphenylethylene epoxide, dicyclopentadiene dioxide, vinylcyclohexene dioxide, bis(3,4-epoxy-6-methylcyclohexylmethyl) adipate, and 3,4-epoxycyclohexylmethyl-3,4-epoxycyclohexane carboxylate.

Suitable epoxy functionalized materials are available from Dow Chemical Company under the tradename DER-332; from Shell Oil Corporation under the trade names EPON 826, 828, and 871; from Ciba-Giegy Corporation under the trade names CY-182 and CY-183; and from Union Carbide under the tradename ERL-4221.

The reactive moieties may generally be present in an amount of greater than or equal to about 0.1, preferably greater than or equal to about 1, more preferably greater than or equal to about 3, most preferably greater than or equal to about 5 wt % of the total composition. It is generally desirable to have the reactive moieties present in an amount of less than or equal to about 30, preferably less than or equal to about 20, more preferably less than or equal to about 15, and most preferably less than or equal to, about 12 wt % of the total composition.

Reaction may occur by heat treatment, ultraviolet irradiation, e-beam irradiation, oxidation, catalytic action, and the like, depending on the particular reactive moiety used. For example, the polymer may optionally further comprise a curing catalyst to increase the curing rate. Curing catalysts, also referred to as initiators, are well known to the art, and are used to initiate the polymerization, cure, or crosslink thermoplastics and thermosets, including unsaturated polyester, vinyl ester, and allylic thermosets. Non-limiting examples of curing catalysts are those described in "Plastic Additives Handbook, 5th Edition" Hans Zweifel, Ed, Carl Hanser Verlag Publishers, Munich, 2001, and in U.S. Pat. No. 5,407,972 to Smith et al., and U.S. Pat. No. 5,218,030 to Katayose et al.

Suitable curing catalyst for the unsaturated portion of the thermoset are those capable of producing radicals at elevated temperatures. Such curing catalysts may include both per-oxy and non-peroxy based radical initiators. Examples of useful peroxy initiators include, for example, benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, a,a'-bis(t-butylperoxy-m-isopropyl) benzene, 2,5-dimethyl-2,5-di(t-butylperoxy)hexane, dicumylperoxide, di(t-butylperoxy isophthalate, t-butylperoxybenzoate, 2,2-bis(t-butylperoxy) butane, 2,2-bis(t-butylperoxy)octane, 2,5-dimethyl-2,5-di (benzoylperoxy)hexane, di (trimethylsilyl)peroxide, trimethylsilylphenyltriphenylsilyl peroxide, and the like, and mixtures comprising at least one of the foregoing curing catalysts. Typical non-peroxy initiators include, for example, 2,3-dimethyl-2,3-diphenylbutane, 2,3-trimethylsilyloxy-2,3-diphenylbutane, and the like, and mixtures comprising at least one of the foregoing curing catalysts. In a preferred embodiment, the curing catalyst may comprise t-butyl peroxybenzoate or methyl ethyl ketone peroxide.

The curing catalyst may promote curing at a temperature of about 0° C. to about 250° C. When present, the curing catalyst may be used in an amount of at least about 0.1, preferably at least about 1 wt %, of the total composition. The curing catalyst may be used in an amount of up to about 10, preferably up to about 5, more preferably up to about 3 wt % of the total composition.

As stated above, polyimides, polyetherimides, and blends comprising polyimides and polyetherimides are particularly suitable for the incorporation of reactive moieties. For example, as shown in FIG. 1, arylene sulfide moieties may be incorporated into a polyimide backbone. After embossing, the sulfur atom may be converted to a higher oxidation state (sulfoxide and/or sulfone) by heating in air. These polyimides are available by appropriate selection of starting monomers and reaction conditions as outlined above. Methods for the conversion of sulfides in polyimide films are described in U.S. Pat. No. 4,609,712.

Figure 2:
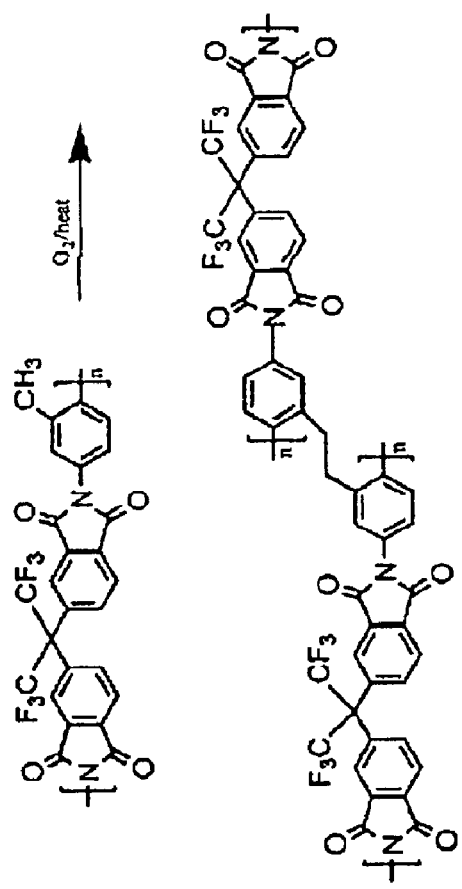
FIG. 2 shows an exemplary embodiment of a polymer comprising toluidine reactive moieties, wherein the glass transition temperature Tg2 may be increased to a temperature greater than the embossing temperature Temb.

Another example is shown in FIG. 2, wherein toluenediamine moieties are incorporated into a polyimide backbone. After embossing, crosslinking may be effected by heating in air. These polyimides are available by appropriate selection of starting monomers and reaction conditions as outlined above.

In accordance with another embodiment, a reactive plasticizer may be incorporated into a polymer having a high Tg in an amount effective to lower the glass transition temperature of the polymer, to Tg1. The polymer having Tg1 is then embossed at a temperature Temb, wherein Temb may be slightly above or slightly lower than Tg1. The plasticizer may be cured during or after embossing, thereby increasing the glass transition temperature of the polymer to Tg2. Alternatively, the plasticizer may be removed from the embossed polymer to achieve Tg2.

Figure 3:
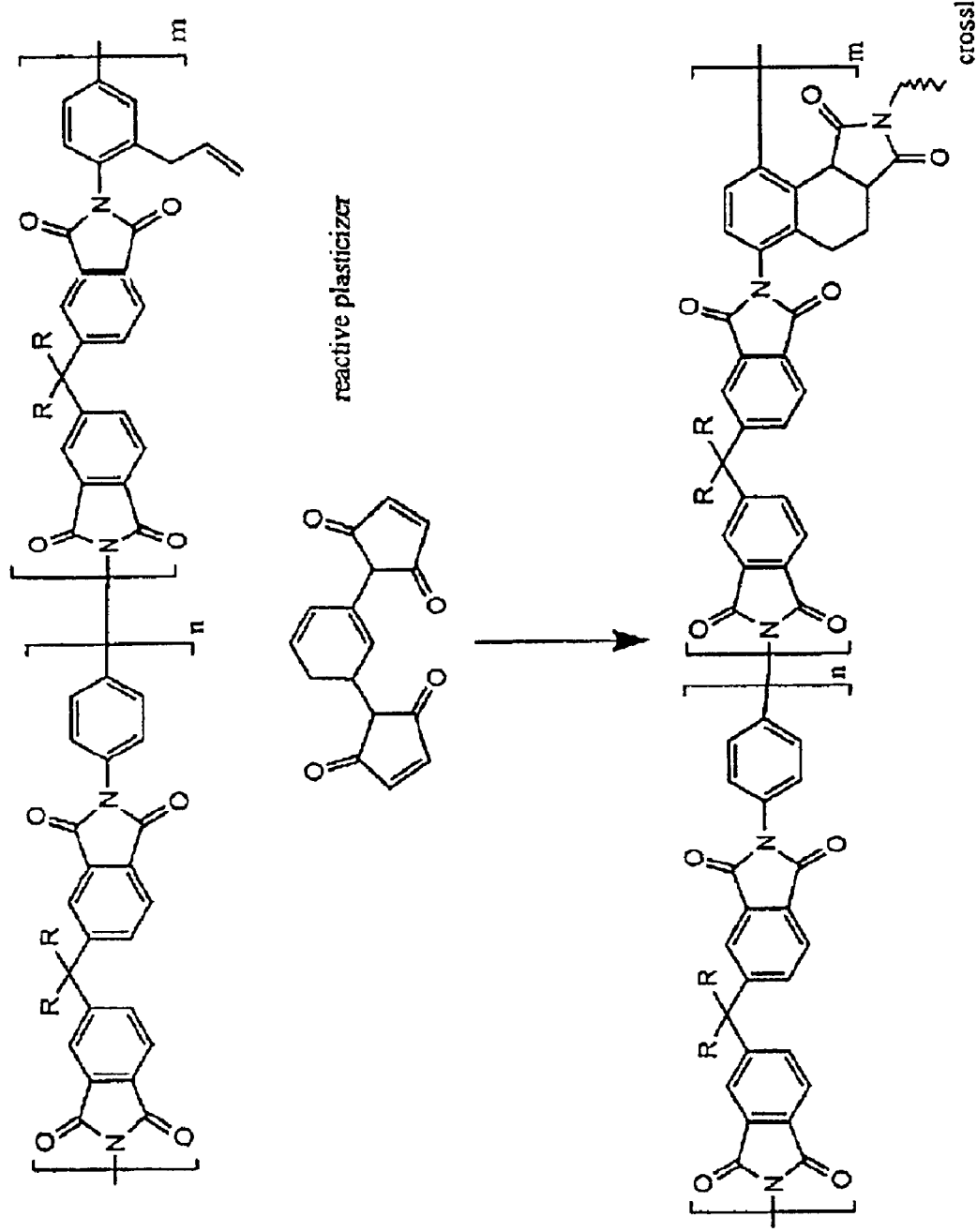
FIG. 3 shows an exemplary embodiment of a polymer comprising a reactive plasticizer, wherein the glass transition temperature Tg2 may be increased to a temperature greater than the embossing temperature Temb.

An example of this approach is shown in FIG. 3, wherein a polyimide comprising a reactive alkene moiety, together with a plasticizer, is embossed and then crosslinked to form a polymer having a glass transition temperature Tg2. When polyimides or polyetherimides are used as the embossed polymer, it is desirable to use a bis-biphenylene additive having a 4-membered ring as the reactive plasticizer. The bis-biphenylene additive undergoes ring scission at an elevated temperature. The reactive plasticizer is preferably of the formula A—R—A where A is a reactive functionality such vinyl substituted aromatic monoamines, polyfunctional alkenyl aromatic monomers, acryloyl monomers, sulfides, toluidines, ethynyl groups, ethyl groups, ethenyl groups, epoxies, fluoroolefins, alkoxysilanes, and combinations comprising at least one of the reactive functionalities, and R is a monomeric or oligomeric polyimide repeat unit such as shown in the formula (XVIII)

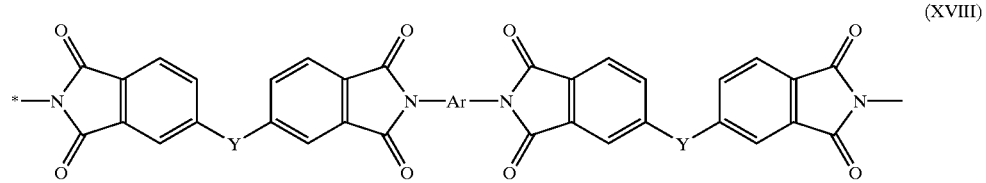

(XVIII)

wherein Y is —O— or a group of the formula —O—Z—O— wherein the divalent bonds of the —O— or the —O—Z—O— group are in the 3,3', 3,4', 4,3', or the 4,4' positions, and wherein Z includes, but is not limited, to divalent radicals of formula (III) as defined above, n is an integer from 0 to about 5 and Ar is an aromatic groups from which diamines are obtained such as m-phenylene, p-phenylene, diphenylether-4,4'-yl, and the like.

Figure 4:
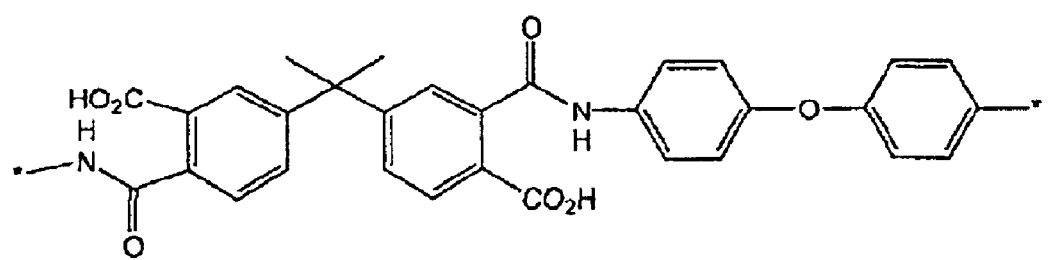
FIG. 4 shows an exemplary polyamic acid that may be cured.

Suitable examples of reactive plasticizers are shown in formulas (XIXa) and (XIX b) below:

In another embodiment, a polyimide comprising one or more of fluorine atoms, silicon atoms, or siloxane segments is achieved by applying the polyimide in polyamic acid form; and curing the applied polyamic acid. This method can also be used to adjust the degree of release from the stamper during the embossing process but also improves adhesion of the embossed polymer surface to the substrate. An exemplary polyamic acid is shown in FIG. 4. Cure of polyamic

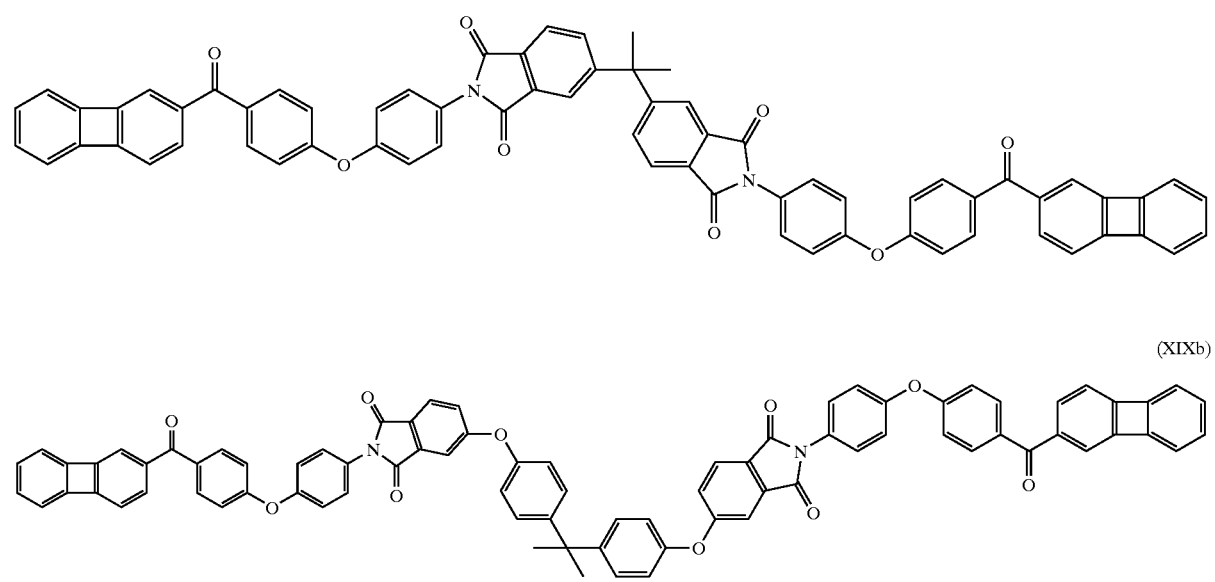

Other reactive moieties are shown in formulas (XlXc) below wherein R is a moiety having aromatic groups, and preferably R has from 36 to 60 carbon atoms.

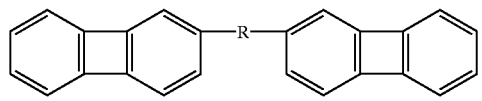

It is generally desirable for the reactive moieties to be present in an amount greater than or equal to about 5, preferably greater than or equal to about 7, more preferably greater than or equal to about 10 wt % of the total polymer composition. It is desirable for the reactive moieties to be present in an amount of less than or equal to about 25, preferably less than or equal to about 23, more preferably less than or equal to about 20 wt % of the total composition.

In another embodiment, the incorporation of fluorine atoms, silicon atoms, or siloxane segments into the backbone of polymer improves the release of a polymeric surface from an embossing tool. For polyimides, this may be achieved by use of one or more of the diamine or dianhydride structures of formula VIIIa, VIIIc, IXa, or IXb. The degree of release may be adjusted by variation in the identity and quantity of the fluorine and/or silicone atom containing monomers. Additionally, the polymer containing the fluorine atom, silicone atom or siloxane segments may be blended with perfluorocarbon polymers described above in order to adjust the degree of release. If adhesion is desired in lieu of release, then adhesion promoters may be used as described below.

acids is readily effected by heat treatment of the coated polyamic acid with or by chemical imidization using an acid anhydride/tertiary amine combination, such as acetic anhydride/triethylamine.

Still another embodiment is directed to embossed films produced by one or more of the above-described methods. These methods are particularly suited for the production of optical, magnetic, and magneto-optic data storage media. Production of such patterned media generally comprises disposing a polymer layer having $T_{g1}$ on at least a portion of a substrate (e.g., the data storage media or disk), embossing at least a portion of the polymer layer, optionally removing at least a portion of the polymer coating to expose at least a portion of the substrate, applying one or more desired layer(s) to at least a portion of the substrate, and optionally removing at least a portion, and optionally all, of the remaining polymer coating. Conversion to $T_{g2}$ may occur at any point in the process during or after embossing.

Suitable substrates are known, for example metal, (e.g., aluminum), glass, ceramic, polymer, metal-matrix composite, and alloys and combinations comprising at least one of the foregoing, and the like). In theory, the substrate can comprise any polymer that exhibits appropriate properties, e.g., the polymer is capable of withstanding the subsequent processing parameters (e.g., application of subsequent layers) such as sputtering (i.e., temperatures of room temperature up to and exceeding about 200° C. (typically up to or exceeding about 250° C.) for magnetic media, and temperatures of about room temperature (about 25° C.) up to about 150° C. for magneto-optic media). That is, it is desirable for the polymer to have sufficient thermal stability to prevent deformation during the deposition steps.

Coating of the substrate with the polymer can be accomplished by a number of methods as is readily understood by an artisan. Exemplary coating techniques include spin coating, vapor deposition (e.g., plasma enhanced chemical vapor deposition, and the like), electrodeposition coating, meniscus coating, spray coating, extrusion coating, and the like, and combinations comprising at least one of the foregoing techniques.

In order to improve adhesion of the coating to the substrate, optionally, an adhesion promoter, such as an organosilane or another conventional adhesion promoter, can be used. If an adhesion promoter is employed, it is typically dissolved in a solvent, such as methanol, water, and combinations comprising at least one of the foregoing solvents, and is applied to the disk prior to applying the polymer. Once the adhesion promoter is spin coated onto the disk, the polymer coating is applied as described above.

Embossing by hot pressing is preferred, in order to achieve sub-micron scale patterning. The mold is preferably preheated to a temperature that, in conjunction with the temperature of the substrate, is capable of embossing the desired surface features onto the polymer surface of the substrate. The mold temperature can be at, above, or below the Tg1 of the polymer to be embossed. If the mold temperature is above the Tg1, it is preferred the mold temperature be within about 30° C., preferably within about 15° C., and more preferably within about 10° C. of Tg1. Alternatively, the mold is preferably at or below Tg1 of the polymer to be embossed, within about 10° C. (especially for amorphous materials), more preferably within about 5° C. (especially for amorphous materials), even more preferably within about 2° C. below Tg1 (especially for crystalline materials).

In addition to heating the mold, the coated substrate may be heated to a temperature greater than the $T_{g1}$ of the polymeric surface to be embossed, preferably a temperature that facilitates replication of the geographic locators and/or other surface features on the substrate. Typically, the substrate is heated to within about 5° C. above $T_{g1}$ for crystalline material, and within about 10° C. for amorphous materials.

Once the substrate has attained the desired temperature, it is placed in the mold and pressure is applied. After placing the substrate in the mold the temperature thereof can be maintained, increased or decreased as necessary in order to optimize replication and enable substrate release from the mold while maintaining the integrity of the surface features. Typically in order to maintain the integrity of the surface features, the molded substrate is cooled to below the glass transition temperature Tg1 prior to removal from the mold. Not to be limited by theory, due to the rheology of the polymer, not only can pits, grooves, bumps, bit patterns, servo-patterns, and edge features be embossed into the substrate, but the desired surface quality can also be embossed, e.g., the desired smoothness, roughness, flatness, microwaviness, and texturing (e.g., microtexturing for magnetic grain orientation). The embossed surface features can have a depth of up to about 200 nm, although greater depths may also be achived, for example up to about 210, or even 25 nm. Typically a depth of about 10 nm, preferably about 20 nm, to about 150 nm, preferably to about 50 nm, can be employed. In the lateral dimension, the surface features, particularly of a magnetic data storage media, would preferably have a "short" dimension of up to or exceeding about 250 nm, with less than about 200 nm more preferred, less than about 150 nm even more preferred, and less than about 100 nm especially preferred.

The embodiments described above are exemplified by the following non-limiting examples:

Preparation of ODPA-MPD Polyamic Acid

A dry 250 ml 3-neck flask equipped with a mechanical stirrer, condenser and a nitrogen inlet was charged with 2.7 gm (0.025 mol) of m-phenylenediamine (MPD) and 20 ml of dry N-methyl-2-pyrollidone (NMP). The mixture was stirred until all the MPD dissolved at which point a solid mixture of 7.595 gm (0.0245 mol) of 4,4'-oxydiphthalic anhydride (ODPA) and 0.148 gm (0.001 mol) of phthalic anhydride was added in small portions over a 30 minute period. Solids adhering to the funnel and walls of the flask were washed down with an additional 12 ml of NMP. The resulting mixture became homogeneous after several hours and was stirred overnight at room temperature then stored in a refrigerator. A small sample of this solution was drawn on a clean, dry glass plate to a thickness of 254 micrometers by means of a doctor blade. The film was transferred to a vacuum oven where it was heated at 75° C. for 1 hour then for 1 hour each at 150° C., 200° C., and 300° C. The resulting polymer film was tough, flexible and exhibited a Tg2 of 296.4° C. as measured by differential scanning calorimetry.

Preparation of 6FDA-MPD

In a similar fashion to that described above, condensation of 2.7 gm (0.025 mol) of MPD with 10.88 gm (0.0245 mol) of hexafluoroisopropylidene diphthalic anhydride (6FDA) and 0.148 gm (0.001 mol) of phthalic anhydride in 40 mL of dry NMP afforded a polyamic acid solution from which a polymer film having a Tg2 of 298.7° C. was obtained as measured by differential scanning calorimetry.

A dry 250 ml 3-neck flask equipped with a mechanical stirrer, condenser and a nitrogen inlet was charged with 2.422 gm (0.0224 mol) of m-phenylenediamine (MPD), 0.549 gm (0.006 mol) of an amine terminated siloxane (G-10), having 10 repeat units and a molecular weight of 954 g/mole and 20 ml of dry N-methyl-2-pyrollidone (NMP). The mixture was stirred until the amines dissolved at which point 7.13 gm (0.023 mol) of solid 4,4'-oxydiphthalic anhydride (ODPA) was added in small portions over a 30 minute period. Solids adhering to the funnel and walls of the flask were washed down with an additional 12 ml of NMP. The resulting mixture became homogeneous after several hours and was stirred overnight at room temperature then stored in a refrigerator. A small sample of this solution was drawn on a clean, dry glass plate to a thickness of about 254 microns by means of a doctor blade. The film was transferred to a vacuum oven where it was heated at 75° C. for 1 hour then for 1 hour each at 150° C., 200° C., and 300° C. The resulting polymer film was tough, flexible and exhibited a $T_{g2}$ of 272.8° C. as measured by differential scanning calorimetry.

Preparation of BPADA/MPD/G-10 (97.5/2.5)

A dry 250 ml 3-neck flask equipped with a mechanical stirrer, condenser and a nitrogen inlet was charged with 2.422 gm (0.0224 mol) of m-phenylenediamine (MPD), 0.549 gm (0.006 mol) of an amine terminated siloxane (G-10), having a molecular weight of 954 g/mole and 20 ml of dry N-methyl-2-pyrollidone (NMP). The mixture was stirred until the amines dissolved at which point 7.13 gm (0.023 mol) of solid Bisphenol A dianhydride (BPADA) was added in small portions over a 30 minute period. Solids adhering to the funnel and walls of the flask were washed down with an additional 12 ml of NMP. The resulting mixture became homogeneous after several hours and was stirred overnight at room temperature then stored in a refrigerator. A small sample of this solution was drawn on a clean, dry glass plate to a thickness of about 254 microns by means of a doctor blade. The film was transferred to a vacuum oven where it was heated at 75° C. for 1 hour then for 1 hour each at 150° C., 200° C., and 300° C. respectively. The resulting polymer film was tough, flexible and exhibited a $T_{g2}$ of 215° C. as measured by differential scanning calorimetry.

EXAMPLES 1–9

Examples 1–9 are representative materials prepared by these processes and are presented in the Table. Example 1 is a polyetherimide obtained by the reaction product of ODPA and MPD, having a Tg2 of 296° C. Examples 2 and 3 show the addition of a polysiloxane to the reaction product of ODPA and MPA. The incorporation of the (G10) dimethylamine-terminated polysiloxane to the polyetherimide backbone in amounts of 2.5 and 5 wt % respectively appears to depress the glass transition temperature. Example 4 represents a polyetherimide obtained as the reaction of ODPA, 2 wt % phthalic anhydride disiloxane (PADS) and MPD. Example 5 shows that the polyetherimide reaction product of 6FDA and MPD has a glass transition temperature of 299° C. Similarly the polyetherimide reaction product of BPADA with MPD shows a Tg depression when copolymerized with polysiloxane. This is reflected in examples 7, 8, and 9.

| Example | Dianhydride(s) | Diamine/Siloxane (Weight Ratio) | Tg (° C.) |
| --- | --- | --- | --- |
| 1 | ODPA | MPD | 296 |
| 2 | ODPA | MPD/G10 (97.5/2.5) | 273 |
| 3 | ODPA | MPD/G10 (95/5) | ND* |
| 4 | ODPA/PADS (98/2) | MPD | 289 |
| 5 | 6FDA | MPD | 299 |
| 6 | BPADA | MPD | 215 |
| 7 | BPADA | MPD/G10 (95/5) | 201 |
| 8 | BPADA | MPD/G10 (90/10) | 195 |
| 9 | BPADA | MPD/G20** (95/5) | 204 |

*ND = not detectable
**G20 has 20 siloxane repeat units.

EXAMPLE 10

Pyralin 2611 a commercially available polyimide (from HD Microsystems) in polyamic acid form in NMP solvent was coated onto a glass substrate. The coated disk was then soft-baked at 150° C. for 2 hours whereupon the disk was placed in an embossing press and embossed at 150° C. with an optical disk stamper having a digital versatile disk (DVD) format. Following embossing, the disk was placed in an oven which was ramped from 150 to 300° C. over 1 hour and held at 300° C. for 1 hour to cure the polymer. Once baked the polymer possessed a glass transition temperature Tg2 of greater than 300° C. and the pre-embossed pattern was maintained. In contrast, embossing of a pre-cured Pyralin 2611 polymer at 150 ° C. resulted in no pattern transfer.

The method of embossing described in the above embodiments provides several advantages that allow the production of improved embossed surfaces. Defects caused by thermal and chemical decomposition are minimized. Production defects caused by adhesion of the embossed polymeric surface to the stamper or embossing tool are reduced. Use of the polymers and methods described above allows the fabrication of articles of high performance, high $T_g$ materials, particularly those wherein the $T_g$ is greater than about 200° C., with improved surface feature definition. Lower temperatures may be used for embossing, resulting in an energy savings. This method may be used in the production of interdigitated electrodes, photoresists, optical, magnetic, and magneto-optical media.

All patents and other references mentioned herein are incorporated by reference in their entirety.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for embossing a surface of a polymer composition, having a first glass transition temperature ($T_{g1}$), the method comprising:

embossing the surface at temperature $T_{emb}$; and
   altering the $T_{g1}$ of the surface to provide a second glass transition temperature ($T_{g2}$), wherein the altering is during embossing, after embossing, or both during and after embossing.

2. The method of claim 1, wherein the polymer composition comprises thermoplastics, thermosets, blends of thermoplastics, blends of thermosets, or blends of thermoplastics with thermosets.

3. The method of claim 2, wherein the polymer is a thermoplastic selected from the group consisting of polyvinyl chloride, polyolefins, polyethylene, chlorinated polyethylene, polypropylene, polyesters, polyethylene terephthalate, polybutylene terephthalate, polycyclohexylmethylene terephthalate, polyamides, polysulfones, hydrogenated polysulfones, polyimides, polyether imides, polyether sulfones, polyphenylene sulfides, polyether ketones, polyether ether ketones, ABS resins, polystyrenes, hydrogenated polystyrenes, syndiotactic and atactic polystyrenes, polycyclohexyl ethylene, styrene-co-acrylonitrile, styrene-co-maleic anhydride, polybutadiene, polyacrylates, polymethylmethacrylate, methyl methacrylate-polyimide copolymers, polyacrylonitrile, polyacetals, polycarbonates, polyphenylene ethers, ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, polytetrafluoroethylene, and combinations comprising at least one of the foregoing thermoplastics.

4. The method of claim 2, wherein the polymer is a thermoplastic blend selected from the group consisting of acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, nylon/elastomers, polyester/ elastomers, polyethylene terephthalate/polybutylene terephthalate, acetal/elastomer, styrene-maleic anhydride/acrylonitrile-butadiene-styrene, polyether etherketone/polyethersulfone, polyimide/polysiloxane, polyetherimide/polysiloxane, polyethylene/nylon, polyethylene/polyacetal, and combinations comprising at least one of the foregoing blends of thermoplastic polymers.

5. The method of claim 2, wherein the polymer is a thermoset selected from the group consisting of epoxy, phenolics, alkyds, polyesters, polyurethanes, silicone polymers, mineral filled silicones, bis-maleimides, cyanate esters, vinyl, benzocyclobutene polymers, and combinations comprising at least one of the foregoing thermosetting polymers.

6. The method of claim 1, wherein the polymer is selected from the group consisting of polyimides, polyetherimides, copolymers of polyimides, copolymers of polyetherimides, and blends comprising at least one of the foregoing polymers.

7. The method of claim 6, wherein the polymer composition comprises reactive moieties selected from the group consisting of vinyl substituted aromatic monoamines, polyfunctional alkenyl aromatic monomers, acryloyl monomers, sulfides, toluidines, ethynyl groups, ethyl groups, ethenyl groups, epoxies, fluoroolefins, alkoxysilanes, and combinations comprising at least one of the foregoing reactive moieties.

8. The method of claim 6, wherein the polymer comprises about 0.1 to about 30 wt. % reactive moieties, based on the total weight of the polymer.

9. The method of claim 6, wherein the polymer composition further comprises a perfluorocarbon.

10. The method of claim 6, wherein $T_{g2}$ is greater than $T_{emb}$.

11. The method of claim 6, wherein $T_{g2}$ is greater than $T_{g1}$.

12. The method of claim 6, wherein the polymer comprises a reactive plasticizer having the structural formula A—R—A wherein A is a reactive functionality selected from the group consisting of vinyl substituted aromatic monoamines, polyfunctional alkenyl aromatic monomers, acryloyl monomers, sulfides, toluidines, ethynyl groups, ethyl groups, ethenyl groups, epoxies, fluoroolefins, alkoxysilanes, and combinations comprising at least one of the reactive functionalities and R is a monomeric or oligomeric polyimide repeat unit shown in the formula (XVIII)

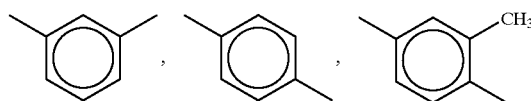

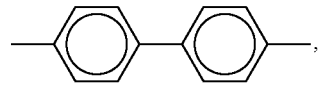

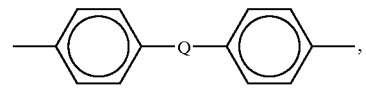

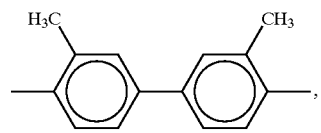

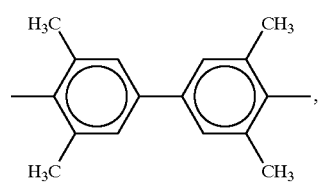

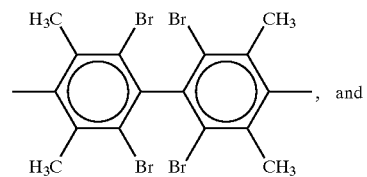

, and

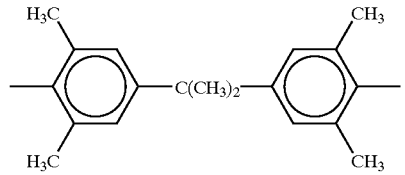

(III)

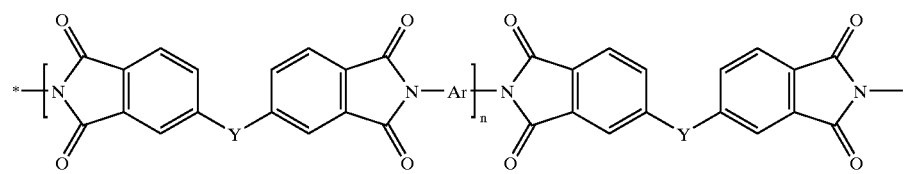

(XVIII)

wherein Y is —O— or a group of the formula —O—Z—O— wherein the divalent bonds of the —O— or the —O—Z—O— group are in the 3,3', 3,4', 4,3', or the 4,4' positions, and wherein Z comprises divalent radicals of formula (III)

wherein n is an integer from 0 to about 5 and Ar is an aromatic group comprising reactive diamines.

13. The method of claim 6, wherein the polymer comprises a reactive plasticizer selected from the group having the structural formula XIXa, XIXb, XIXc,

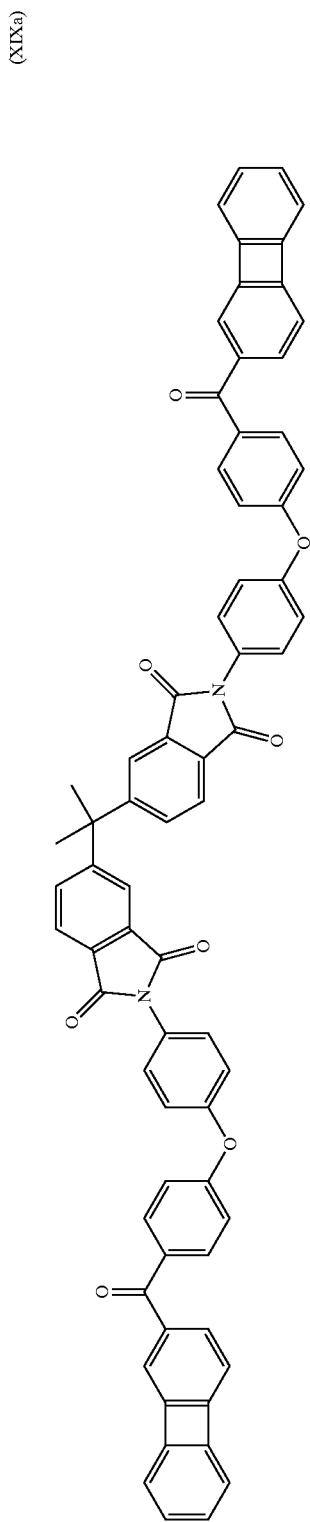
(XIXa)
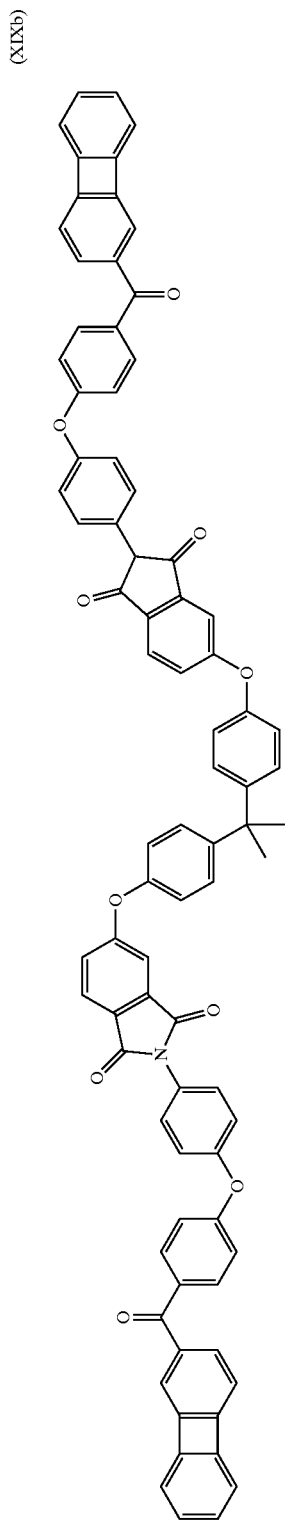
(XIXb)
(XIXc)

or combinations comprising at least one of XIXa, XIXb, XIXc, wherein R is an aromatic moiety having about 36 to about 60 carbon atoms.

14. The method of claim 13, comprising about 5 to about 25 wt % reactive plasticizer, based on the total weight of the composition.

15. The method of claim 6, wherein the polyimide, polyetherimide, copolymer of polyimide, or copolymer of polyetherimide has one or more of fluorine atoms, silicon atoms, or siloxane segments.

16. The method of claim 6, wherein the polymer composition further comprises polyamic acid.

17. A method for the manufacture of an embossed polymer surface, which comprises:

embossing a surface comprising a polymer and a plasticizer having reactive moieties; and reacting the reactive moieties to increase the glass transition temperature of the embossed polymer surface.

18. The method of claim 17, wherein the polymer surface comprises a thermoplastic selected from the group consisting of polyimides, polyetherimides, copolymers of polyimides, copolymers of polyetherimides, blends of polyimides with perfluorocarbons, blends of polyetherimides with perfluorocarbons and combinations comprising at least one of the foregoing thermoplastics.

19. The method of claim 17, wherein the polymer comprises a reactive plasticizer in an amount effective raise the glass transition temperature of the polymer after crosslinking.

20. The method of claim 17, wherein the polymer comprises reactive moieties selected from the group consisting of vinyl substituted aromatic monoamines, polyfunctional alkenyl aromatic monomers, acryloyl monomers, sulfides, toluidines, ethynyl groups, ethnyl groups, ethenyl groups, epoxies, fluoroolefins, alkoxysilanes, and combinations comprising at least one of the foregoing reactive moieties.

21. The method of claim 17, wherein the polymer comprises a reactive plasticizer having the structural formula A—R—A where A is a reactive functionality selected from the group consisting of vinyl substituted aromatic monoamines, polyfunctional alkenyl aromatic monomers, acryloyl monomers, sulfides, toluidines, ethynyl groups, ethnyl groups, ethenyl groups, epoxies, fluoroolefins, alkoxysilanes, and combinations comprising at least one of the reactive functionalities and R is a monomeric or oligomeric polyimide repeat unit shown in the formula (XVIII)

wherein Y is —O— or a group of the formula —O—Z—O— wherein the divalent bonds of the —O— or the —O—Z—O— group are in the 3,3', 3,4', 4,3', or the 4,4' positions, and wherein Z comprises divalent radicals of formula (III)

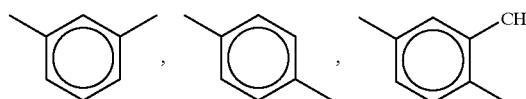
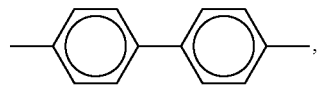
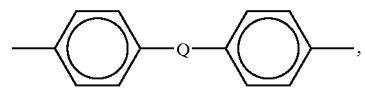
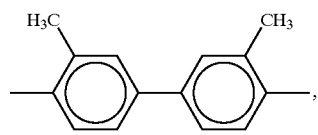
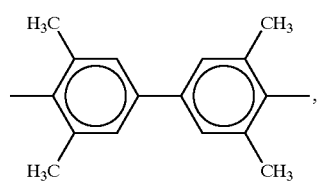
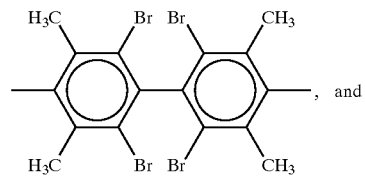
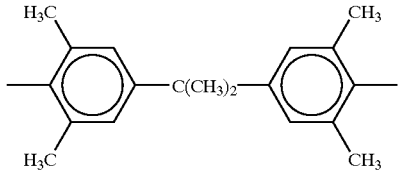

(III)

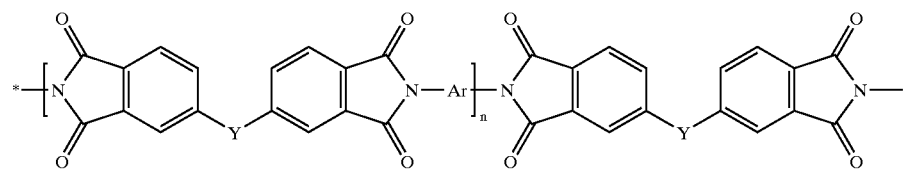

(XVIII)

wherein n is an integer from 0 to about 5 and Ar is an aromatic group comprising reactive diamines.

22. The method of claim 17, wherein the polymer comprises a reactive plasticizer selected from the group having the structural formula XIXa, XIXb, XIXc:

(XIXa) 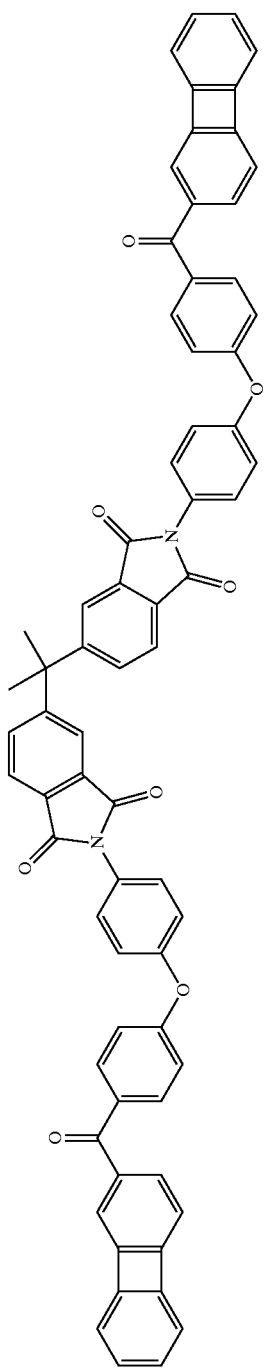
(XIXb) 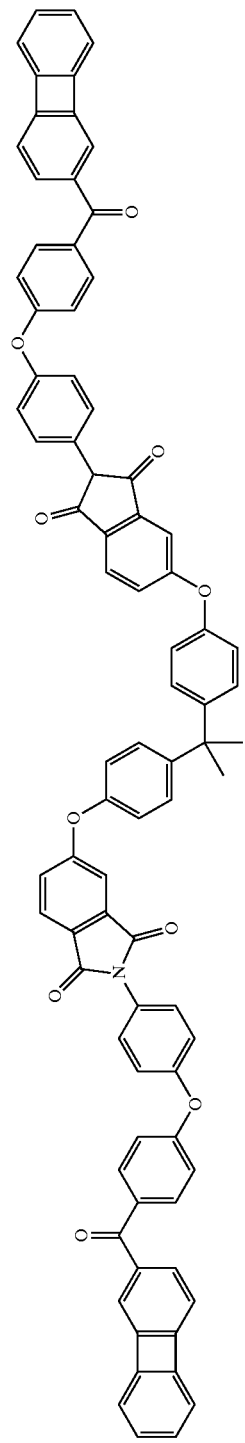
(XIXc) 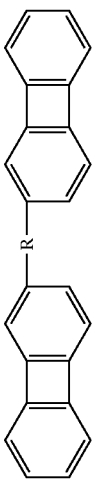

or combnations comprising at least one of XIXa, XIXb, XIXc, wherein R is a moiety having aromatic group and from 36 to 60 carbon atoms.

23. A method for the manufacture of an embossed polymer surface, which comprises:

embossing a surface comprising the reaction product of m-phenylenediamine and a dianhydride; and treating the embossed polymer to increase the glass transition temperature of the embossed polymer.

24. The method of claim 23, wherein the dianhydride is selected from the group consisting of bisphenol A dianhydride, 4,4'-oxydiphthalic anhydride, hexafluoroisopropylidene diphthalic anhydride, and combinations comprising at least one of the foregoing dianhydrides.

25. The method of claim 23, wherein an amine terminated siloxane is further added to the reaction product of m-phenylenediamine and the dianhydride.

26. The method of claim 23, wherein polyamic acid is further added to reaction product of m-phenylene diamine and the dianhydride.

27. The method of claim 23, wherein the polymer surface comprises reactive moieties selected from the group consisting of vinyl substituted aromatic monoamines, polyfunctional alkenyl aromatic monomers, acryloyl monomers, sulfides, toluidines, ethynyl groups, ethnyl groups, ethenyl groups, epoxies, fluoroolefins, alkoxysilanes, and combinations comprising at least one of the foregoing reactive moieties.

28. The method of claim 23, wherein the polymer comprises a reactive plasticizer.

* * * * *

UNITED STATES PATENT AND TRADEMARK OFFICE
CERTIFICATE OF CORRECTION

PATENT NO.        : 6,977,057 B2
APPLICATION NO. : 10/063407
DATED              : December 20, 2005
INVENTOR(S)      : Reitz et al.

It is certified that error appears in the above-identified patent and that said Letters Patent is hereby corrected as shown below:

On Title Page:
(73) Assignee, delete "Pittsfield, MA" and insert therefor -- Schenectady, NY --
Column 2:
Line 10, before "polymer" insert -- the --
Column 5:
Line 60, delete "S02" and insert therefor -- $SO_2$ --
Line 60, delete "H2y" and insert therefor -- $H_{2y}$ --
Column 6:
Line 61, delete "H2N" and insert therefor -- $H_2N$ --
Line 61, delete "NH2" and insert therefor -- $NH_2$ --
Column 11:
Line 35, after "sulfides" delete "pr" and insert therefor -- or --
Column 13:
Line 67, delete "C(6-14)" and insert therefor -- $C_{(6-14)}$ --
Column 14:
Line 1, delete "C(6-14)" and insert therefor -- $C_{(6-14)}$ --
Line 5, delete "H2RN" and insert therefor -- $H_2RN$ --
Line 5, delete "NH2" and insert therefor -- $NH_2$ --
Column 17:
Line 4, after "aromatic" delete "groups" and insert therefor -- group --
Column 19:
Line 59, after "be" delete "achived" and insert therefor -- achieved --
Column 21:
Line 46, after "2611" insert -- ( --
Line 46, before "from" delete "("

UNITED STATES PATENT AND TRADEMARK OFFICE
CERTIFICATE OF CORRECTION

PATENT NO. : 6,977,057 B2
APPLICATION NO. : 10/063407
DATED : December 20, 2005
INVENTOR(S) : Reitz et al.

It is certified that error appears in the above-identified patent and that said Letters Patent is hereby corrected as shown below:

Column 27:
Line 31, after "effective" insert -- to --

Signed and Sealed this

Fourth Day of March, 2008

JON W. DUDAS
*Director of the United States Patent and Trademark Office*